United States Patent [19]

Mizukoshi et al.

[11] Patent Number: 4,891,713
[45] Date of Patent: Jan. 2, 1990

[54] METHOD OF SAMPLING PICTURE SIGNALS AND APPARATUS THEREFOR

[75] Inventors: Seiichi Mizukoshi, Kanagawa; Tomonori Satoh, Tokyo, both of Japan

[73] Assignee: Eastman Kodak Company, Rochester, N.Y.

[21] Appl. No.: 209,132

[22] Filed: Jun. 20, 1988

[51] Int. Cl.$^4$ .............................................. H04N 1/40
[52] U.S. Cl. ..................................... 358/445; 358/138
[58] Field of Search ............... 358/138, 280, 297, 285, 358/445

[56] References Cited

U.S. PATENT DOCUMENTS 4,563,700  1/1986  Sato ...................................... 358/138

Primary Examiner—Edward L. Coles, Sr.
Attorney, Agent, or Firm—Raymond L. Owens

[57] ABSTRACT

Method and apparatus for collecting image data of a picture by sampling N points of picture signals N times on each of a plurality of scanning lines, and converting the signal obtained at each of the sample points into digital signals characterized by sequentially sampling K different frames or portions of the picture by sampling for each frame M points of each line such that no sample points overlap and the data for one picture is collected by scanning K frames.

3 Claims, 4 Drawing Sheets

METHOD OF SAMPLING PICTURE SIGNALS AND APPARATUS THEREFOR

BACKGROUND OF THE INVENTION

This invention relates to method and apparatus for collecting data, and more particularly, to sampling data from a picture input device by using low speed circuits.

PRIOR ART

FIG. 1a shows an example of a well known data collecting apparatus. An analog input signal is supplied to a sample and hold circuit 30 and is sampled and held under the control of timing pulses from a sampling clock generator 50. The output of the sample and hold circuit 30 is supplied to an analog-digital converter 40 and converted to a digital signal, and the operational timing of the analog-digital converter is similarly controlled by the pulses form the sampling clock generator 50.

In this data collecting apparatus, if a picture signal is converted, for example, to a digital signal, it is usual for picture A to be scanned along a plurality of scan lines B, as shown in FIGS. 4a and 4b, to produce a picture signal which is, in turn, supplied to the sample and hold circuit 30. The sampling of this picture signal is achieved by either one of two methods. One of the methods is shown in FIG. 1b and is arranged such that, in response to the timing pulses supplied from the sampling clock generator 50, sampling is achieved successively in columns having sampling points C which start from the uppermost scan line.

The data collection method shown in FIG. 1b mentioned above has drawbacks in that the sampling is achieved at the same speed as that of the picture signal so that the sample and hold circuit and the analog/digital converter have to be capable of processing the input signals at high speed, and moreover, in a case where a memory circuit or the like is connected to a subsequent stage, such a circuit must also have high speed processing ability. On the other hand, the data collecting method shown in FIG. 1c does not require high speed processing circuits, but there are such drawbacks that the sampling of the data point of a picture (frame) requires a total scanning time equal to a frame scanning period for a column of points multiplied by the total number of columns or sampling points on a scan line.

SUMMARY OF THE INVENTION

It is, therefore, an object of the present invention to remove the drawbacks of the above-mentioned conventional data collecting method and to provide a novel data collecting method and apparatus therefore in which even when a low speed processing circuit is used the data collecting time can be reduced so that it is less than that of the data collecting method illustrated in FIG. 1c.

To attain the above-mentioned object, a method of the present invention includes the steps of collecting image data of a picture made up of K frames by sampling N points of a picture signal (N being a positive integer) on each of a plurality of scanning lines, said picture signals having been obtained by line scanning a picture along said scanning lines, and converting the signals obtained at each of the sample points into digital signals. The method is characterized by the step of sequentially sampling K different frames of the picture by sampling for each frame M points of each line, where N/K is equal to M and K is an integer, such that no sample points overlap and for one picture is collected by scanning K frames.

BRIEF DESCRIPTION OF THE DRAWINGS

FIG. 3b is an illustration showing signal wave forms at portions of the apparatus of FIG. 3a;

FIG. 4a is an illustration showing in detail the arrangement of the pulse generator portions of the apparatus of FIG. 3a;

FIG. 4b is an illustration showing signal waveforms portions of FIG. 4a;

DESCRIPTION OF THE PREFERRED EMBODIMENTS

An embodiment of this invention will now be described with reference to FIGS. 2 to 4a and 4b.

Figure 1A:
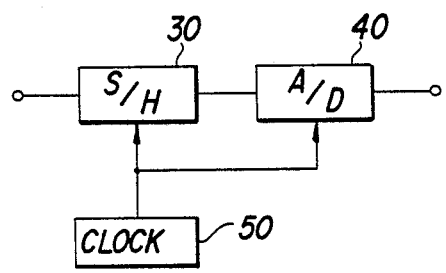
FIG. 1a is an illustration showing an example of conventional data collecting apparatus.
Figure 1B:
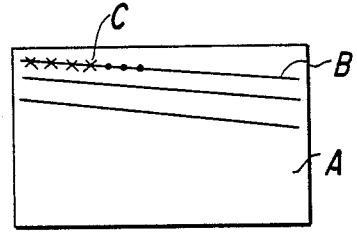
FIGS. 1b and 1c are illustrations explaining conventional data collecting methods.
Figure 1C:
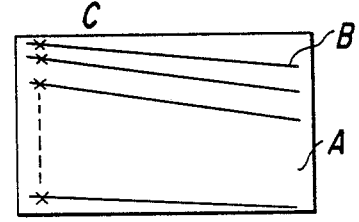
Figure 2:
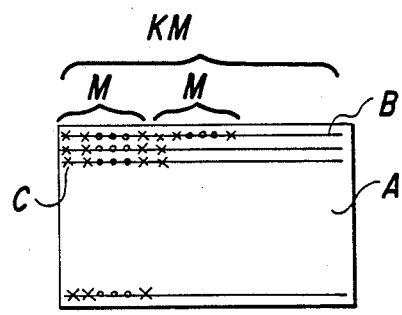
FIG. 2 is a schematic which explains an example of a data collecting method of the present invention.

FIG. 2 schematically shows an example of the data collecting apparatus in accordance with the present invention. By a well known electronic scanning type photoelectric converting device, a subject A such as a painting, photograph or the like, is horizontally scanned consecutively from its upper end to its lower end along a number of scanning lines B, and as a result of a plurality of horizontal scanning lines B, and as a result of a plurality of horizontal scannings from the upper edge to the lower edge the picture information contained in the subject 4 is taken out as picture signals for every subject scanned. A picture can be considered to made up of K frames or portions. Data sampling is achieved in the following manner. Assuming that total of N points are to be sampled on each of the scanning lines of picture, M consecutive points are sampled on each of the scanning lines from the left end in a first frame, where M is equal to N/K and K is an integer of 2 or more. When M samples on the lowermost scanning line have been obtained, the second frame starts and the sampling is effected on its respective scanning lines from the (m+1)th sampling point to the (2m)th sampling point. In this manner, as the sampling is performed in the third frame, the fourth frame and so on, M consecutive samplings points on the respective scanning lines are shifted K times rightwards, so that when the sampling in the Kth frame has been completed, the N points have been sampled on each of the scanning lines. The number N is equal to K×M. In this manner, since sampling is performed M times in each frame scanning, the picture information on one picture can be collected M times faster than the case of the data collection method of FIG. 1c.

Figure 3A:
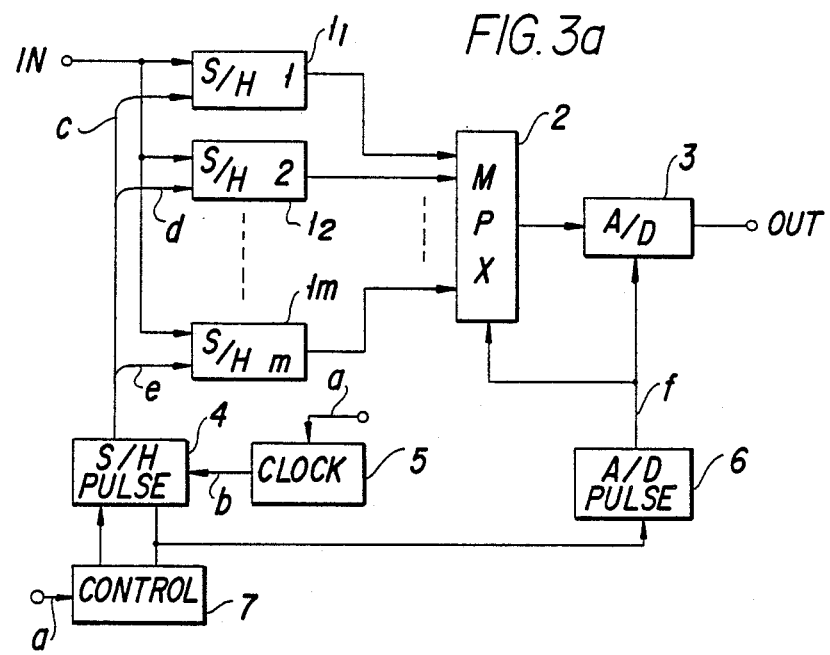
FIG. 3a is a block diagram of an apparatus for practicing the data collecting method of the present invention.

FIG. 3a shows a block diagram of an exemplary arrangement of an apparatus for working the above-mentioned data collecting method. The picture signal from the electronic scanning type photoelectric converting device obtained by scanning the subject A is supplied to an input terminal IN. This input terminal is connected to the inputs of M number of sample and hold circuits $1_1, 2_2, \ldots 1m$. The hold outputs of these sample and hold circuits $1_1$ - $1m$ are supplied through a multiplexer 2 to an analog-digital converter 3 from which a digital signal is taken out at its output terminal OUT.

In order to provide the sample and hold circuits $1_1$, $2_2$, ... $1m$ with the timing for sample and hold operations, a sample and hold pulse generator 4 supplies sample and hold pulses (S/H pulses) to the sample and hold circuits in order. The sample and hold pulse generator 4 generates S/H pulses in accordance with the reference pulses synchronized with the line synchronization signals supplied from a clock generator 5.

Pulses (A/D pulses) for providing the timing for analog-digital conversion is supplied from an analog-digital conversion pulse generator 6 to the multiplexer 2 connected to the outputs of the M number of sample hold circuits $1_1$ - $1n$ and to the analog-digital converter 3 connected to the output of the multiplexer.

The timing with which the sample and hold pulse generator 4 generates S/H pulses is controlled by a control unit 7, and the initiation of generation of the A/D pulses is controlled by the sample and hold pulse generator 4.

Figure 3B:
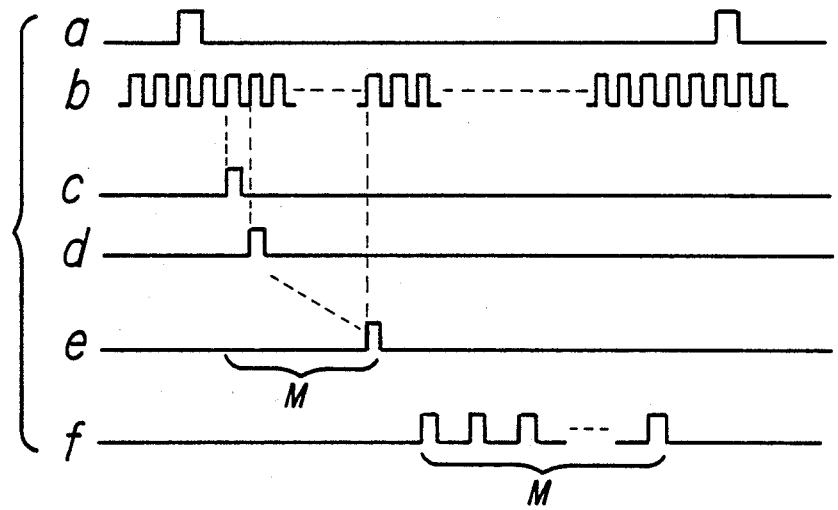

The operation of the apparatus of FIG. 3a will now be described with the reference to the first frame by way of FIG. 3b. The reference characters a-f are signal wave forms at portions of FIG. 3a. The electronic scanning type photoelectric converting device supplies the picture signal to the input terminal IN and also the frame synchronization signal and the line synchronization signal to the control unit 7. When the line synchronization signal a is input to the control unit 7 at a particular time in the first frame, the control unit 7 causes the sample and hold pulse generator 4 to generate M number of S/H pulses, the S/H pulses being shifted to one another by one pulse cycle of the reference pulse b. Of the M number of S/H pulses, the first pulse c is fed to the sample and hold circuit $1_1$, and the second pulse d to the sample and hold circuit $1_2$. In this manner, the S/H pulses are consecutively fed to the sample and hold circuits, and the M-th S/H pulse e is fed to the sample and hold circuit $1m$, so that sampling is performed M times from the left on one scanning line.

After the M number of S/H pulses have been generated, the sample and hold pulse generating circuit 4 informs the analog-digital conversion pulse generator 6 of this fact, which causes the latter to generate M number of A/D pulses H. When receiving the first A/D pulse, the multiplexer 2 selects the sample and hold circuit $1_1$ and supplies the hold output to the analog-digital converter 3. With the second A/D pulse, the multiplexer 2 feeds the hold output of the sample and hold circuit $1_2$ to the analog-digital converter 3. Thereafter similarly, as when receiving an A/D pulse, the multiplexer 2 performs a change-over operation and supplies the hold output of the sample and hold circuit in order to the analog-digital converter 3.

The M number of A/D pulses are also supplied to the analog-digital converter 3 so that it consecutively converts the hold outputs from the M number of sample and hold circuits $1_1$ - $1m$ to digital signals in synchronize with the timing of the A/D pulses and thus the change-over operation of the multiplexer 2.

The above-mentioned operation is performed every time the line synchronization signal is input into the control unit 7, that is, when each horizontal scanning is performed in the first frame. The digital signals obtained in the first frame are appropriately stored in a memory.

In the second frame, as the control unit 7 receives a line synchronization signal, the control unit causes the sample and hold pulse generator 4 to initiate sampling from the (M+1)th sampling point on each scanning line. In the third frame, as the control unit 7 receives a line synchronization signal, control unit 7 causes the sample and hold pulse generator 4 to initiate the sampling from the (2M+1)th sampling point on each scanning line. Thereafter a similar operation to that in the first frame is performed. After this, the control unit 7 operates so that M number of pulses are generated from the sample and hold pulse generator 4 for each frame at a time at which the sampling point on each scanning line is shifted M times rightwards and so in the K-th frame, KM number of samples are performed on each scanning line, and the data sampling of the picture signal for one picture is finished. The number KM of course equal to the number N.

As mentioned above, K and M are each an arbitrary integer which may be 2 or more and may be appropriately selected in consideration of the design conditions, such as a processing speed of the sample and hold circuits analog-digital converter. It should also be satisfied that the total number N of sampling points of each scanned line is equal to KM. Moreover, the cycle of M number of pulses supplied from the analog-digital converter has to be selected so that the converting operation in the analog-digital converter has been completed before initiation of the next line scanning. This factor should be considered when determining the values of K and M.

Figure 4A:
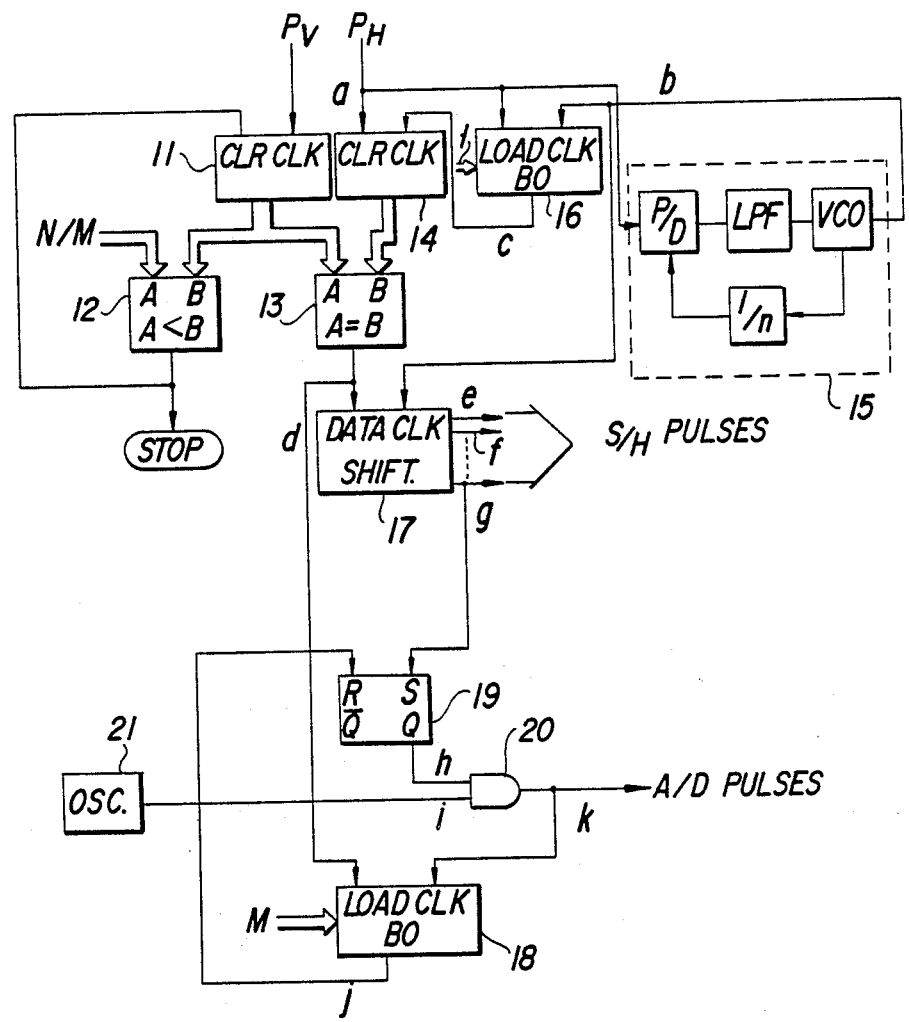

FIG. 4a shows in more detail the sample and hold pulse generator 4, the clock generator 5 and the analog-digital conversion pulse generator 6 of FIG. 3a. In the figure, a first counter 11 receives a vertical synchronization signal $P_v$ at its clock terminal and counts the number of the frames. The output of the first counter 11 is input to first and second comparators 12 and 13. The first comparator 12 compares N/M (=K) with a number appearing the output of the first counter 11, i.e., the number of the frame. When the number output from the counter 11 exceeds N/M, the first comparator generates an output to clear the first counter 11 and also stops the operation of the apparatus. The second comparator 13 compares the output of the first counter 11 with the output of a second counter 14. The second comparator 13 and the second counter 14 will be described hereinbelow.

A PLL type clock signal generator 15 supplies to a CLK input of a third counter 16, a clock pulse having a frequency W times as much as that of the line synchronization signal $P_H$, i.e. a frequency $nf_H$ ($f_H$ being a frequency of the line synchronization signal.) The third counter 16 is an M-adic down counter. The counter 16 is preset to 1 every time the line synchronization signal $H_H$ is supplied to its LOAD input, and thereafter counts down the clock pulses. Every time the third counter 16 becomes zero, the BORROW terminal BO thereof becomes high. In other words, the third counter 16 outputs N/M number of pulses during one line scan. The outputs from the terminal BO of the third counter 16 are applied to the CLK terminal of the second counter 14, and CLK terminal thereof is also supplied with the line synchronization signal $P_H$. Therefor, the second counter 14 counts from 1 to N/M during one line scanning.

When the count value of the first counter 11 coincides with the count of the second counter 14, the second comparator 13 outputs M pulses for the period of M number of clock pulses. These output pulses are applied to DATA terminal of a shift register 17 and LOAD terminal of a fourth counter 18. Thus, the sift register 17 receives at its CLK terminal the clock pulse from the clock generator 15 which outputs M number of S/H pulses, and the number M is preset in the fourth counter 18. The M-th S/H pulse output from the shift register 17 is applied to the set terminal of a flip-flop 19, the output of which is applied to one input of a gate 20. Another input to the gate 20 is supplied with pulses from an oscillator 21. The output of the gate 20 is the A/D pulses which is applied to CLK terminal of the fourth counter 18. The BORROW output of the fourth counter 18 is applied to RESET terminal of the flip-flop 19.

Figure 4B:
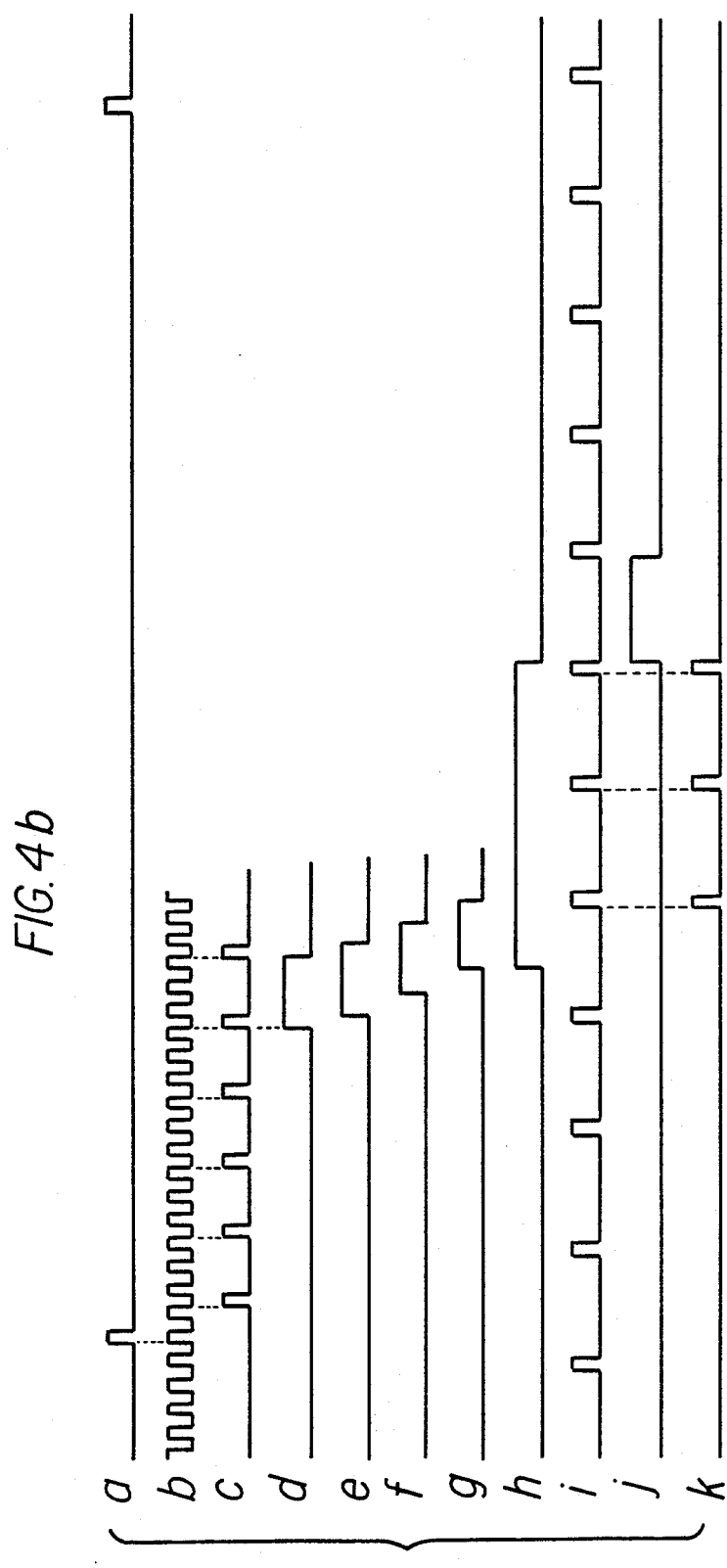

The operation of the circuit of FIG. 4a will now be described with reference to FIG. 4b which shows input and output signals at portions of the FIG. 4a arrangement. In this example, M is equal to 3 and the 5th frame from the initial condition is being performed. The wave forms shown by a–k in FIG. 4b correspond to the signals provided by the corresponding the portions shown by a–k in FIG. 4a, respectively.

With the conditions of the example just described, the first counter 11 outputs "5" and the third counter 16 outputs one pulse c from the terminal BO every time three clock pulses b are input to the third counter. Thus, when five pulses counted from the line synchronization signal are output from the third counter 16, the output of the second counter 14 becomes 5, and the second comparator 13 detects the coincidence of the two inputs and produces a high output d. This high-output is input to DATA terminal of the shift register 17 so that the shift register 17 receives the clock signal b to generate S/H pulses e–g which are shifted from one another by one clock pulse.

The high-output of the second comparator 13 is also applied to the fourth counter 18 in which M=3 is loaded.

When the shift register 17 outputs the M-th S/H pulse, i.e., the 3rd S/H pulse g, the flip-flop 19 is set, and the output thereof turns to high so that the gate 20 opens and the output i of the oscillator 21 passes therethrough and is output as A/D pulses k. The fourth counter 18 counts down this A/D pulses, and when the counted value thereof becomes zero the output j of the fourth counter turns to high so that the flip-flop 19 is reset and the output thereof turns to low to close the gate 20. In this manner, three A/D pulses are output during the period when the gate 20 remains open.

As will be clear from the above description, the first, second and third counters 11, 14 and 16 and the second comparator 13 control the start and end of sampling in each line scan of each frame. In FIG. 4b, the first to fourth counters are arranged to count the rising edges of the clock pulses. Analog digital conversion may be performed between the time m number of samples have finished and the time a subseuent sampling operation is initiated. This is the reason the separate low frequency oscillator 21 is provided.

The following are numerical examples of operating parameters for the circuit of FIG. 4a: $f_H$=15.734 kHz; N=775; M=8; the frequency of the clock signal from the clock generator 5 is 12.194 MHz; and the oscillating frequency of the oscillator 21 is $\geq$125.9 kHz.

As described above, the present invention is arranged such that when sampling is achieved KM times on each of the scanned lines to collect data for one picture, M different points are sampled on each scanned line when scanning a frame and the sampling points on the scanning lines of each frame are shifted M times in one direction so that the data sampling for a picture is completed by scanning K frames. With such arrangement the invention is advantageious in that there is no need to use any particularly high speed processing sample and hold circuits or analog digital-converters and that the time required for collecting data for one picture can be reduced in comparison with any conventional data sampling apparatus using low speed circuits.

The invention has been described in detail with particular reference to certain preferred embodiments thereof, but it will be understood that variations and modifications can be effected within the spirit and scope of the invention.

We claim:

1. Apparatus for collecting data of a picture which is made up of K frames by sampling picture signals N times (N being a positive integer) on each of a plurality of scanning lines in synchronism with synchronization signals for line and frame scannings, said picture signals being obtained by line scanning a picture along said scanning lines, and converting the signals obtained at each of the sampling points into digital signals, comprising:

a. a pulse generator for generating time pulses each shifted in timed relationship with respect to one another, said timing pulses being M in number within the period of one line scanning (M being equal to N/K and K being an integer of 2 or more);
   b. sample and hold means adapted to receive said picture signals and said M timing pulses to perform sample and hold operations on said picture signals M times for every line scanned and produce an output signal;
   c. control means responsive to the synchronization signals for controlling the generation of said timing pulses from said pulse generator so that the points at which said sample and hold means achieves the sampling of said picture signals on the respective scanning lines do not overlap on the respective frame scans and wherein said control means causes frame scanning to be achieved K times; and
   d. analog-digital converter means for converting the output signal of said sample and hold means to a digital signal during a period between the time when said sample and hold means completes the sample and hold of said picture signals M times and the time when it initiates the sample and hold for a subsequent M number of times; whereby the data for one picture is collected by frame scanning K frames.

2. Apparatus for collecting data as set forth in claim 1, wherein said control means comprises:

a. clock generator for generating a clock signal at a frequency which is N times higher than that of said synchronization signal for line scanning in synchronizm therewith;
   b. a first counter supplied with said synchronization signal for frame scanning and counting the same;
   c. a second counter supplied with said clock signals, the count value being J when it counts J M clock signals, where (J is equal to 1, 2, ... K; and d. a comparator for comparing the count values between said first and second counters and generating an output at the time when both of the count values coincide with each other, whereby the operation of said pulse generator is initiated by the output of the comparator.

3. Apparatus for collecting data as set forth in claim 1 said control means comprises:
  a. a clock generator for generating a clock signal at a frequency which is N times higher than that of said synchronization signal for line scanning in synchronizm therewith;
  b. a first counter supplied with said synchronization signals for frame scanning and counting the same;
  c. a second counter for counting said clock signals;
  d. a comparator for comparing the count values between said first and second counter to generate an output in a period during which the count value of said first counter does not exceed that of said second counter; and
  d. a third counter responsive to the output from said comparator for producing a pulse every time said clock signals are counted up to (LM/M+1) numbers, where L is equal to (l=0, 1, 2, . . . M−1); whereby the pulses output from said third counter serve for said timing pulses.

* * * * *